United States Patent [19]

Haraikawa

[11] 4,068,745

[45] Jan. 17, 1978

[54] DISC BRAKE

[75] Inventor: Tetsuo Haraikawa, Funabashi, Japan

[73] Assignee: Tokico Ltd., Kawasaki, Japan

[21] Appl. No.: 713,036

[22] Filed: Aug. 10, 1976

[30] Foreign Application Priority Data

Aug. 14, 1975 Japan .................................. 50-98823
Aug. 14, 1975 Japan .................................. 50-98828

[51] Int. Cl.² .......................................... F16D 55/224
[52] U.S. Cl. .................................................. 188/73.3
[58] Field of Search ..................... 188/71.1, 71.3, 73.1, 188/73.3, 73.5

[56] References Cited

U.S. PATENT DOCUMENTS

| 3,268,034 | 8/1966 | Burnett | 188/73.3 UX |
| 3,375,906 | 4/1968 | Hayes | 188/73.3 |
| 3,688,876 | 9/1972 | Hirai et al. | 188/73.3 |

FOREIGN PATENT DOCUMENTS

| 1,555,241 | 12/1968 | France | 188/73.3 |
| 2,514,383 | 11/1975 | Germany | 188/73.3 |
| 2,014,468 | 10/1970 | Germany | 188/73.3 |

Primary Examiner—Duane A. Reger
Attorney, Agent, or Firm—Schmidt, Johnson, Hovey & Williams

[57] ABSTRACT

A floating caliper-type disc brake in which friction pads act on separate support arms on the opposite sides of the disc whereby the material and weight of the support are reduced.

6 Claims, 5 Drawing Figures

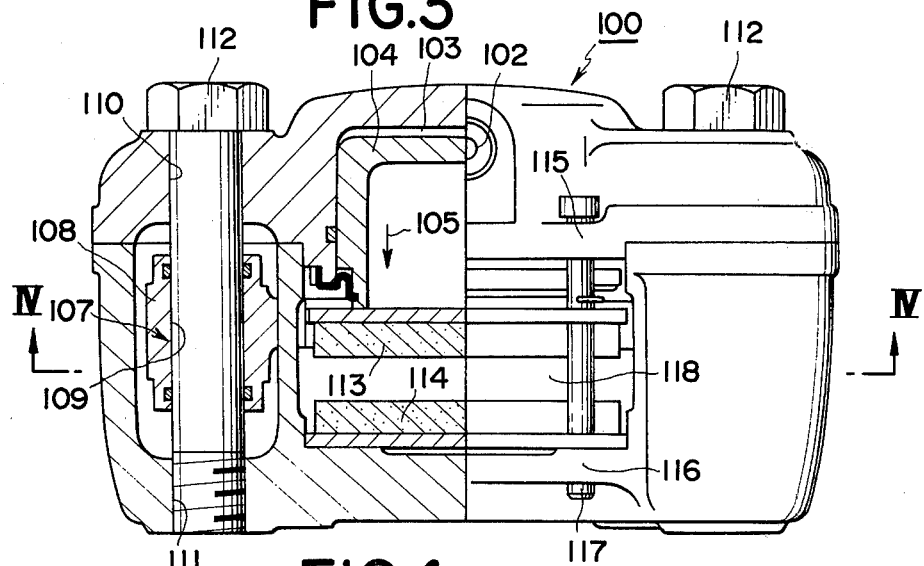
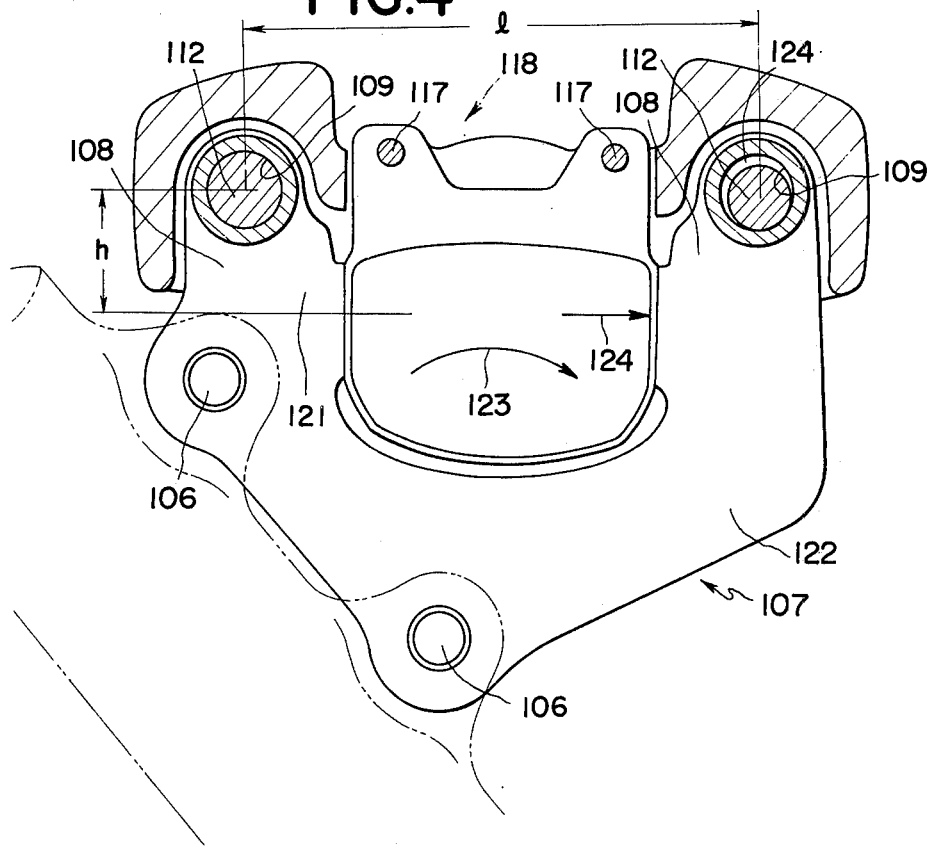

4,068,745

DISC BRAKE

BACKGROUND OF THE INVENTION

This invention relates to a disc brake and more particularly, to a floating caliper-type disc brake of the type in which the disc receives braking forces on the opposite surfaces and in which a braking force acting on one surface of the disc is received by one end portion of a support and a braking force acting on the other surface of the disc is received by the other end portion of the support whereby the force applied to the support is evenly distributed to thereby reduce the amount of material of the support without sacrificing the rigidity of the support.

There have been proposed and practically employed a variety of floating caliper-type disc brakes and in one typical one of such prior art disc brakes, a braking force acting on one surface of the disc is directly transmitted to the support and a braking force applied to the other surface of the disc is indirectly transmitted to the support through the housing and slide bolts or slide pins to be ultimately transmitted to a vehicle to thereby attain the intended object. In such a prior art disc brake, since it is designed that the substantial portion of braking force provided by a pair of friction pads is to be received by one end portion of the support, there is the disadvantage that the support should be strong enough to bear such substantial braking force resulting in increase in size.

Furthermore, in a prior art disc brake for a two-wheeled vehicle and especially, for the front wheel of a vehicle, since the support of the disc brake is secured to the boss on the front forks, the mounting holes in the support by means of which the support is secured to the boss are not symmetric with respect to the two arms of the support.

In the disc brake having the left-hand arm of its support secured to the body of a vehicle as shown in FIG. 4, for example, when the brake is applied, the moment produced by the brake pads is greater on the support right-hand arm than on the support left-hand arm. Therefore, it has been generally practiced that the support arm receiving a greater moment is reinforced by making it thicker and larger than the support arm receiving a smaller moment. However, this method increases the weight of the brake itself and requires extra material and has been found to be an unsatisfactory solution.

SUMMARY OF THE INVENTION

Therefore, the present invention is to eliminate the disadvantages inherent in the prior art disc brakes by applying braking forces of friction pads on separate support arms on the opposite surfaces of the disc.

Thus, the object of the present invention is to provide a floating caliper-type disc brake in which the distance between the axes of the bolt guide holes formed in the arms of the support is made greater than that between the axes of the bolts received in the guide holes whereby braking force is applied to the support arm which does not receive a braking force from a friction pad directly supported on the support to evenly distribute the force applied to the support to thereby improve the rigidity of the support, match the performance of the prior art disc brakes in spite of reduction in the amount of material and attain many improvements with respect to weight aspect.

When the present invention is utilized in a two-wheeled vehicle, without varying the distance between the axes of the bolt guide holes in the support and the distance between the axes of the slide bolts received in the guide holes, it is only necessary that a clearance or play be left between the pin guide hole in the arm at the end of the support which is not directly connected to the vehicle and the slide pin received in the guide hole and substantially the whole braking force moment generated by the braking pads is transmitted to the arm at the other end of the support which is directly supported on the vehicle whereby the necessity of reinforcing the non-supported support arm by increasing the thickness of the arm or providing a rib on the arm can be eliminated and in consequence, the problems such as increase in the weight of the brake itself, extra material for such reinforcement and uneven load distribution can be solved.

The above and other objects and attendant advantages of the present invention will be more readily apparent to those skilled in the art from a reading of the following detailed description in connection with the accompanying drawings which show preferred embodiments of a floating caliper-type disc brake of the invention for illustration purpose only, but not for limiting the scope of the same in any way.

BRIEF DESCRIPTION OF THE DRAWINGS

FIG. 3 is a top plan view of another embodiment of a floating caliper-type disc brake constructed in accordance with the present invention and adapted to be employed in a two-wheeled vehicle showing a portion of the brake in section;

FIG. 4 is a side elevational view in partial section taken along substantially the line IV—IV of FIG. 3; an FIG. 5 is a top plan view of still another embodiment of a floating caliper-type disc brake constructed in accordance with the present invention showing a portion of the brake in section.

PREFERRED EMBODIMENTS OF THE INVENTION

Figure 1:
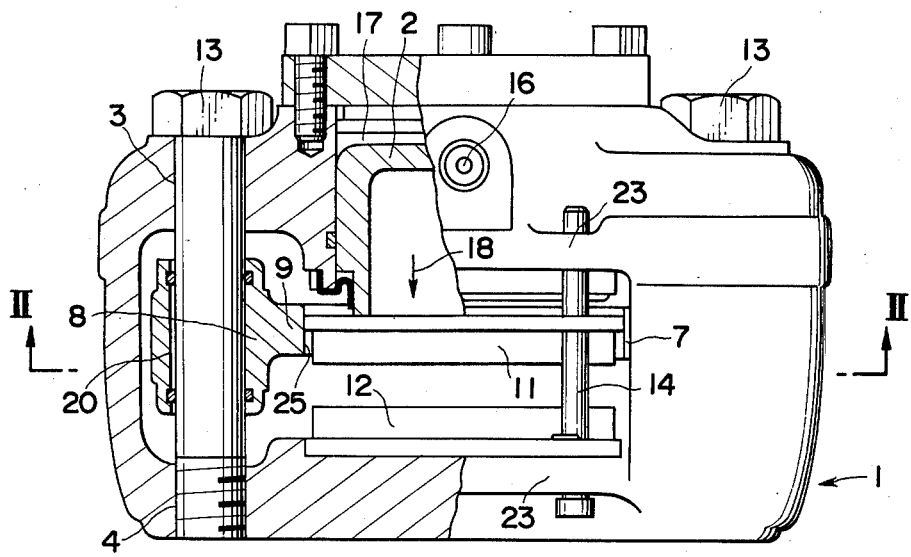
FIG. 1 is a top plan view of one preferred embodiment of a floating caliper-type disc brake constructed in accordance with the present invention showing a portion of the brake in section.

The present invention will now be described referring to the accompanying drawings and more particularly, to FIGS. 1 and 2 thereof in which a first preferred embodiment of floating caliper-type disc brake of the invention is shown. The operation principle of the inventive disc brake is substantially similar to that of the prior art disc brakes. Thart is, when the brake is applied, a metered amount of oil under pressure is supplied from a suitable oil supply source (not shown) through an oil inlet hole 16 formed in the upper portion of the housing 1 into a cylinder 17 defined in the housing and in communication with the oil inlet hole whereupon the pressure of the oil moves a piston slidably received in the cylinder 17 in the arrow direction 18 toward the disc (not shown). When the piston 2 is moved in the arrow direction 18 under oil pressure as mentioned above, a reaction force is generated by the oil pressure in response to the movement of the piston to thereby bodily move the housing 1 in the direction opposite to the arrow direction 18 by the fact that slide bolts or pins 13 slidably move within holes 20 formed in a support 9 as will be described in detail hereinafter. In this way, the disc is engaged on one surface by a friction pad 11 which is directly operated by the piston 2 and guided between arms 7, 8 on the support 9 and engaged on the other surface by a second friction pad 12 held in position on the housing 1 by means of a suitable conventional means. The friction pads 11, 12 are slidably mounted on pins 14, 14 which are in turn supported in ribs 23, 23 on the housing 1.

Furthermore, as is well known in the art, the housing 1 is mounted on the slide bolts or pins 13, 13 extending slidably through holes 20, 20 formed in the arm 7, 8 on the support 9 which is secured to a stationary part of a vehicle (not shown) by way of mounting holes 19, 19 formed in the support and the opposite ends of the slide pins are fixedly received in aligned holes 3, 4 in the housing 1 whereby the housing 1 is slidably movable relative to the support 9.

Figure 2:
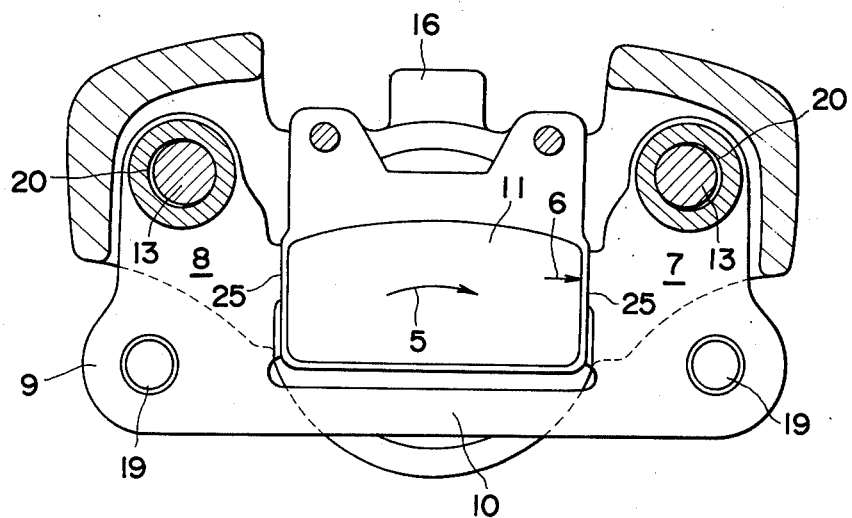
FIG. 2 is a side elevational view in partial section taken substantially along the line II—II of FIG. 1.

In the disc brake illustrated in FIGS. 1 and 2, the axes of the pins 13, 13 of the housing 1 are somewhat offset with respect to those of the holes 20, 20 in the support 9, respectively. That is, the axes of the pin guide holes 20, 20 in the support 9 are positioned slightly outwardly of those of the pins 13, 13, respectively, the diameter of which is slightly smaller than that of the holes 20 and the distance between the axes of the holes 20, 20 in the support 9 is greater than that between the axes of the pins 13, 13 of the housing 1. The amount of eccentricity of the axis of each of the pins 13, 13 with respect to the axis of the respectively associated one of the holes 20, 20 is a function of the diameters of the holes 20 and pins 13. To put it in more detail, as shown in FIG. 2, when the pins 13, 13 are slidably inserted in the respectively associated holes 20, 20 in the support 9 and are snugly fitted in the holes 3, 4 in the housing 1, respectively, the inner side face of each of the pins 13 makes contact with the opposed or inner side face of the associated hole 20.

With the above-mentioned construction and arrangement of the components of the floating caliper-type disc brake of the invention, the following operative advantages can be obtained. Referring to FIG. 2 particularly, when the disc brake is applied in the manner described hereinabove, on the assumption that the disc is rotating in the arrow direction 5, a braking force from the friction pad 11 which directly acts on the support 9 is applied in the arrow direction 6, that is, the pad 11 and more particularly, the backing plate on the pad moves toward the right-hand arm 7 on the support 9 until the right-hand edge of the backing plate edge abuts against the left-hand edge of the arm 7. On the other hand, a braking force from by the second friction pad 12 which is adapted to move in the axial direction of the disc together with the housing 1 is also applied in the arrow direction 6. However, since the friction pad 12 is held in position on the housing 1, it is necessary that the braking force from the pad 12 in the arrow direction 5 be first transmitted to the housing 1 and then escape to the support 9 through the right-hand or left-hand pin 13 and arm 7 or 8. In this case, if the braking force takes the course of housing 1 — right-hand pin 13 — arm 7 — support 9, as clear from FIG. 2, since the right-hand side face of the right-hand pin 13 is not in contact with the right-hand side face of the associated hole 20, no force transfer is effected between the pin 13 and hole 20 under consideration. On the other hand, if the braking force takes the course of housing 1 — left-hand pin 13 — arm 8 — support 9, since the right-hand side face of the pin 13 is in contact with the right-hand or inner face of the associated hole 20, the braking force is transmitted to the support 9 and finally to the vehicle (not shown). Thus, the braking force of the friction pad 12 is transmitted to the left-hand arm 8 as distinguished from the transmission mode of the braking force of the friction pad 11. When the disc is rotating in the direction opposite to the arrow direction 5, it will be easily understood that the braking forces from the friction pads 11, 12 are transmitted to the left-hand and right-hand arms 8 and 7, respectively by reversing the transmission courses as described hereinabove.

Thus, according to the present invention, one half of the whole braking force is applied to the arms 7 and 8, respectively to thereby reduce the load on the arms 7, 8 as compared with the corresponding parts of the prior art floating caliper-type disc brakes. Furthermore, since the base of the support 9 which connects between the arms 7, 8 of the support has a calculated bending moment of zero, the amount of material of the base can be substantially reduced.

When compared with the prior art disc brakes, in the disc brake of the present invention, if the support 9 is not provided with the holes 20, 20 which loosely receive the pins 13, 13, when the disc is rotating in the arrow direction 5, for example, a braking force from the friction pad 11 would be, of course, applied to the right-hand arm 7 and in addition, about one half of a braking force from the friction pad 12 is applied to the right-hand arm 7 through the right-hand pin 13 whereby about 75% of the whole braking force would be applied to the right-hand arm 7. On the other hand, in the disc brake of the invention, 50% of the whole braking force is applied to each of the arms, 7, 8 which brings out substantial difference between the present invention and prior art with respect to design. When the base 10 of the support 9 which connects the arms 7 and 8 together is considered, in the prior art disc brake, assuming that the rightward moment about the right-hand fulcrum 19 of the support 9 is 75 L kg — $m$ (L: moment arm), the leftward moment about the left-hand fulcrum 19 is 25 L kg — $m$ and an upward force of 50 L kg — $m$ is still acting on the base 10 of the support 9. On the other hand, in the disc brake of the present invention, the moment is 50 L kg — $m$ both about the right-hand and left-hand fulcurums, respectively and no upward force is acting on the base 10 of the support 9. Thus, the present invention can satisfactorily attain its intended objects such as saving in material, reduction in weight and the like.

Turning now to FIGS. 3 and 4 in which a second embodiment of floating caliper-type disc brake of the invention which is advantageously employed on a two-wheeled vehicle is shown.

As mentioned in connection with the first embodiment of the invention hereinabove, when the driver applies the brake disc, a metered amount of oil under pressure is supplied from a suitable oil supply source (not shown) through an oil inlet hole 102 formed in the upper portion of the housing 100 into a cylinder 103 defined in the housing 100. The incoming oil pressure moves a piston 104 slidably received in the cylinder 103 in the arrow direction 105 toward the disc (not shown) to generate a reaction force. The thus generated reaction force bodily moves the housing 100 in the direction opposite to the arrow direction 105 relative to a substantially Y-shaped vertically extending support 107 which is fixedly secured to front forks of a vehicle body shown by phantom lines in FIG. 2 at mounting holes 106 in the conventional manner. The Y-shaped support 107 has left- and right-hand arms 121, 122 each having a thickened or horizontally and laterally extending portion 108 provided with an axial through hole 109 at the upper end. Slide pins 112, 112 are slidably received in the through holes 109, 109 in the thickened portion 109, 109 on the arms 121, 122 of the support 107 and snugly fitted at the opposite ends in aligned holes 110, 111 of the housing 100 whereby the housing 100 can bodily and slidably move relative to the support 107. In this way, the disc is engaged on one surface by the friction pad 113 which is directly operated by the piston 104 and on the other surface by the second friction pad 114. The friction pad 113 is suspended on parallel and spaced pins 117, 117 which are supported at the opposite ends in upper ribs 115, 116 on the housing 100 which is slidably guided by means of 112, 112 on the housing 100 and the through holes 109, 109 in the support 107. The friction pad 114 is held in position on the housing 100 by suitable means and suspended on the slide pins 117, 117 in the same manner as the friction pad 113.

In the embodiment of FIGS. 3 and 4, the friction pad 113 is slidably received between the arms 121, 122 on the support 107 and when the piston 104 is moved in the arrow direction 105, the pad 113 is slidably guided between the support arms in the arrow direction to be applied against the disc.

As more clearly shown in FIG. 4, in the second embodiment of the invention, although the through hole 109 in the left-hand arm 108 of the support 107 snugly and slidably recieves the associated pin 112, the through hole 109 in the right-hand arm 109 of the support 107 loosely receives the associated slide pin 112 with a clearance 125.

Thus, if the brake is applied when the disc 123 is rotating in the arrow direction 123 as seen in FIG. 2, the braking force from the friction pad 113 acts in such a manner that the friction pad and more particularly, the backing plate associated with the friction pad moves in the arrow direction 124 until the right-hand side edge of the backing plate abuts against the left-hand side face of the right-hand arm 122 of the support 107. The braking force transmitted to the arm 122 in this way is directly applied through the support 107 to the vehicle (not shown). On the other hand, the braking force from the friction pad 114 adapted to move together with the housing 100 to be applied against the surface of the disc opposite to the disc surface against which the friction pad 113 directs in the arrow direction 124. However, since the friction pad 114 moves together with the housing 100, the braking force of the pad in the arrow direction produces the effect to move the housing 100 in the arrow direction 124. Since the housing 100 has the slide pins 112, 112 secured thereto, the braking force of the friction pad 114 is converted into a force which urges the pins 112, 112 rightwards. When the relationship between the pins 112, 112 and support 107 or the holes 109, 109 in the arms 121, 122 of the support 107 is considered, although the left-hand hole 109 snugly receives the associated pin 112, the right-hand hole 109 loosely receives the associated pin 112 with the clearance 125. Thus, the force urging the pins 112, 112 rightwards is transmitted to the support 107 only through the left-hand pin 112 and arm 121.

That is, in the second embodiment of disc brake of FIGS. 3 and 4, one half of the whole braking force is separately applied to each of the arms 121, 122 of the support 107. This arrangement is apparently advantageous over the prior art disc brakes. In the prior art disc brakes in which the holes in the left-hand and right-hand arms of the support snugly receive the slide pins, when the disc is rotating in the arrow direction 123, for example, the braking force from the friction pad 113 adjacent the piston 104 is, of course, applied to the right-hand arm 122. And the braking force from the other friction pad 114 is substantially equally distributed to the arms 121, 122. That is, about 75% of the whole braking force is applied to the right-hand arm 122 whereas the remaining 25% of the braking force is applied to the left-hand arm 121. This necessitates increasing the thickness of the right-hand support arm that is, the arm should receive a greater force or the arm should be provided with a reinforcing rib. The second embodiment of the invention will be described further in detail. Assuming that the braking force from one friction pad is designed as F, the distance between the axes of the slide pins 112, 112 is designed as $l$ and the distance between the slide bolt and operation point in the arrow direction is designed as $h$, then it can be considered that an upward moment having the magnitude $F \cdot h/l$ will act on the other friction pad. Generally, in this type of disc brake, $h/l < 1$ and the force to be applied to the right-hand arm 122 is reduced. Furthermore, this force $F \cdot h/l$ tends to rotate the right-hand arm 122 in the counterclockwise direction and offsets a portion of the braking force of the fricton pad 113 or the force tending to rotate the arm 122 in the clockwise direction which is directly applied to the right-hand arm 122 resulting in substantial reduction of the force applied to the right-hand arm 122 whereby reinforcement for the right-hand arm 122 as required in the conventional disc brakes becomes unnecessary.

In the embodiment of FIGS. 3 and 4, since the pads 113, 114 are merely suspended on the pins 117, 117 on the opposite surfaces of the disc within the opening 118 formed in the upper portion of the housing 100, when the pins 117, 117 are once removed as necessary or desired, the friction pads 113, 114 can be easily taken out of the opening 118 for replacement.

Figure 5:
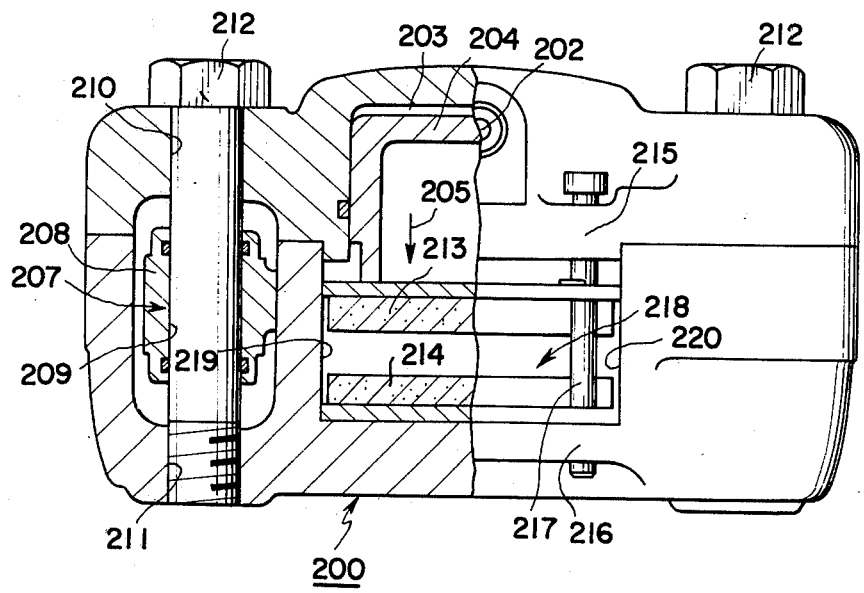

FIG. 5, considered in conjunction with FIG. 4, shows a third or further modified embodiment of floating caliper-type disc brake of the invention in which the braking forces from both the friction pads are directly transmitted to the housing to thereby further improve the performance of the brake. In the embodiment of FIG. 5, in which elements common also to the embodiment of FIGS. 3 and 4 are designated by reference numerals greater by 100 than those used in FIGS. 3 and 4 (to avoid confusion with such other embodiment), both the friction pads 213, 214 are positioned in abutment against the axial walls 219, 220 forming the end walls of the opening 218 defined between the ribs 215, 216 of the housing 200 which ribs form the side walls of the opening 218. Thus, assuming that the disc (not shown) is rotating in the clockwise direction as seen in FIG. 5 with the right-hand slide pin 212 loosely received in the associated hole 209 in the support 217 and the left-hand slide pin 212 snugly fitted in the associated hole 209 of the support, in the application of the disc brake, both the braking forces from the friction pads 213, 214 are transmitted to the left-hand arm 221 of the support 217 through the left-hand slide pin 212 whereas no braking load is applied to the right-hand arm 222 whereby the performance of the disc brake of the invention is further improved.

As is clear from the foregoing description of the preferred embodiments of the invention, according to the present invention, the hole formed in the arm at one end of the support where the support is fixedly secured to a stationary part of a vehicle slidably and snugly receives the associated slide pin and the hole in the other arm of the support loosely receives the slide pin to thereby provide an improved disc brake which balances between the braking forces of the two friction pads, is balanced with respect to rigidity, is economical and is light.

While several embodiments of the invention have been shown and described in detail it will be understood that the same are for illustration purpose only and not to be taken as a definition of the invention, reference being had for this purpose to the appended claims.

What is claimed is:

1. Floating caliper type disc brake apparatus, for use in association with a machine provided with base structure and a brake disc mounted for rotation relative to said structure and having a pair of oppositely facing surfaces extending outwardly relative to the axis of rotation thereof and including respective brakable zones juxtaposed and adapted to be oppositely engaged by opposed braking means, said apparatus including:
   a support assembly of generally bifurcated configuration having a bight portion and a pair of spaced arm portions;
   first means adapted for rigidly mounting said support assembly on said structure with one of said arm portions being displaced from the other arm portion in a direction generally parallel to the direction of movement of said zones during rotation of said disc;
   a housing assembly having a pair of spaced caliper portions;
   second means, including a generally cylindrical hole in each of said arm portions and a generally cylindrical pin for each of said holes respectively extending through the corresponding hole and between said caliper portions, for shiftably mounting said housing assembly on said support assembly for movement relative to the latter along a path generally parallel to said axis of rotation of said disc with certain opposed parts of each of said caliper portions being in spaced, facing relationship to the respectively corresponding zone of said disc;
   a pair of brake pads;
   third means for mounting one of said pads on said parts of one of said caliper portions in facing relationship to one of said zones of said disc; and
   fourth means for shiftably mounting the other of said pads on said parts of the other of said caliper portions in facing relationship to the other of said zones of said disc and for shifting said other pad in a direction generally parallel to said axis of rotation of said disc toward and into forceful engagement with said other zone for both exerting a braking force on the latter and causing said housing assembly to shift along said path and thereby move said one pad into opposing braking engagement with said one zone of said disc;
the improvement of which apparatus further includes so constructing and arranging said second means that:
   said pins are rigid and are in respective direct sliding relationship with those wall portions of the corresponding holes which are contacted thereby,
   at least the one of said holes which is provided in said one arm portion is of substantially larger diameter than the corresponding one of said pins,
   the spacing between the central axes of said holes is at least as great as the spacing between the central axes of said pins,
   the differences between the diameters of each pin and its corresponding hole and the difference between the spacings of the central axes of the pins and the central axes of the holes are so related that said one pin is prevented from contacting the portion of the wall of said one hole remote from said other hole by said other pin first contacting the portion of the wall of said other hole proximate said one hole,
   whereby, when lateral reaction forces are exerted on said pads in the general direction of said displacement of said one arm portion from said other arm portion during braking engagement of said pads with said zones of said disc, those lateral forces exerted upon said one pad will be transmitted through said housing assembly, is other pin and said other hole and applied to said other arm portion of said support assembly.

2. The invention of claim 1, wherein:
said other pin is normally in working sliding engagement with portions of the wall of said other hole all around the circumference thereof.

3. The invention of claim 1, wherein there is provided:
means for operably coupling said other pad with said one arm portion during braking engagement of said pad with said zones for applying those of said lateral forces exerted upon said other pad directly to said one arm portion.

4. The invention of claim 3, wherein:
both of said pins are normally in sliding engagement with the portions of the walls of their corresponding holes which are in nearest proximity to each other.

5. The invention of claim 3, wherein:
said other pin is normally in working sliding engagement with portions of the wall of said other hole all around the circumference thereof.

6. The invention of claim 3, wherein there is provided:
means for operably coupling said other pad with said housing assembly during braking engagement of said pad with said zones for transmitting those of said lateral forces exerted upon said other pad through said housing assembly, said other pin and said other hole and applying the same to said other arm portion.

* * * * *